June 17, 1969 J. M. AHY 3,450,362

SIGNAL RECORDING AND/OR PLAYBACK APPARATUS

Filed Aug. 18, 1967 Sheet 2 of 2

United States Patent Office 3,450,362

Patented June 17, 1969

3,450,362

SIGNAL RECORDING AND/OR PLAYBACK APPARATUS

Jahangir M. Ahy, 13 Duke St., Manchester Square, London W. 1, England

Filed Aug. 18, 1967, Ser. No. 661,631
Claims priority, application Great Britain, Aug. 19, 1966, 37,359/66; May 19, 1967, 23,484/67
Int. Cl. B65h *55/16, 17/02, 17/42*
U.S. Cl. 242—55.16 8 Claims

ABSTRACT OF THE DISCLOSURE

The specification describes a signal recording and/or playback apparatus for use with a broad band record carrier in the form of an endless loop which is stored in random fashion in a random storage compartment of the machine. During recording or playback, the band is withdrawn from the storage compartment, and after circulation passed the recording or playback head, is returned to the compartment. The apparatus includes feeder mechanism for feeding the band from a spool, on which it is wound in double spiral form at the time of inserting the band into or removing it from the machine, into the random storage compartment, for circulating the band through the machine during recording or playback, and for rewinding the band on the spool when it is to be removed from the machine. In the case of a magnetic record band, an isolating band of non-magnetic material is interposed between the magnetic coatings on the record band when it is wound up on the spool, and the machine includes means for unwinding and storing the isolating band while the feeding mechanism is feeding the record band into the random storage compartment and circulating the record band through the machine for recording or playback, and for rewinding the isolating band on the spool between the magnetic coatings when the recording band is being rewound on the spool.

BACKGROUND OF THE INVENTION

The invention relates to signal recording and/or playback apparatus in which the signals are recorded magnetically, mechanically or optically on a broad record band in a plurality of spaced parallel tracks or track sections.

In prior apparatus using a broad band record, the band has generally not been endless and has had to be manually threaded through the machine from a feed spool to a take-up spool. When an endless band is used, it is stored in a cassette which is insertable into the machine. Such cassettes are expensive and require considerable space for storage. The invention enables the record band, when removed from the machine, to be stored in wound-up condition in double spiral form, thus consuming the minimum of storage space, and when inserted in the machine, to be easily and quickly fed into the random storage compartment so as to be ready for use.

SUMMARY OF THE INVENTION

The present invention consists in a signal recording and/or playback apparatus comprising a wide band record in the form of an endless loop which is inserted into the apparatus wound up in double spiral form, a storage compartment which is adapted to store therein, in a random fashion, a major part of the band, said compartment having an opening through which the band can be withdrawn from and fed into the compartment, drive rollers positioned respectively adjacent opposite sides of said opening, a transducer head, a capstan for advancing the band passed said transducer head, a movable feeder member comprising counter rollers adapted to co-operate with said drive rollers respectively, the loop of band at the free end of the spirally wound-up band being looped around said capstan and said feeder member, said feeder member being movable from a first position in which said counter rollers are spaced from said drive rollers to a second position in which said counter rollers are urged towards their associated drive rollers respectively with the band gripped therebetween and traversing said opening, and means for seelctively driving both said drive rollers in opposite directions towards the opening to feed the band through the opening and into the random storage compartment, and for driving one of said drive rollers towards said opening and at least one of said other drive roller and capstan in the direction to withdraw the band from said compartment and feed it passed the transducer.

The feeder mechanism serves both for unwinding the record band from the spool and feeding it into the random storage compartment, and also for feeding the band, when so stored, out of the compartment to the transducer head and back to the compartment.

It will be appreciated that when a magnetic wide band record is wound in double spiral form, the coating of magnetic material on adjacent turns will, on one side, touch each other while, on the other side, will be spaced apart by two thicknesses of the base material of the band. Where magnetic coatings touch one another there can be a transfer of the magnetically recorded signals between the touching turns which can cause "cross-talk" and damage to the recording.

According to a feature of the invention, the band is wound with an isolating layer of non-magnetic material, such as paper or plastic foil, between the turns where the coatings would otherwise touch.

According to another feature of the invention the machine is provided with a roller on which this isolating layer is wound up as the band is being unwound and being fed into the random storage compartment, the end of this isolating layer remaining attached to the spool so that when the band is re-wound thereon, when it is desired to remove the spool and band from the machine, the isolating layer will automatically be re-wound on the spool between the magnetic coatings.

A further feature of the invention consists in the spool on which the record band is wound up in double spiral form.

In order that the invention may be more clearly understood, reference will now be made to the accompanying drawings, in which.

Figure 5:
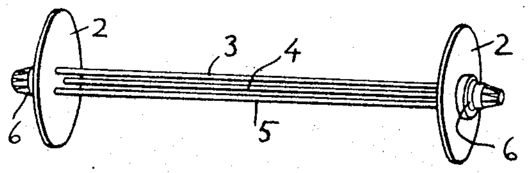
FIGURE 5 is a perspective view of a spool.

The drawings show schematically a recording and/or playback machine for an endless broad magnetic record band on which the signals are magnetically recorded in a plurality of spaced parallel tracks extending generally in the longitudinal direction of the band. Rotatably mounted in suitable bearings carried by a frame structure diagrammatically indicated at 10, are a capstan 16, drive rollers 21 and 22, guide rollers 24*a* and a take-up roller 31. A spool 1 on which the record band 15 is wound up in double spiral form is also adapted to be removably mounted on the frame structure 10. As shown in FIGURE 5, the spool comprises a pair of end discs 2 between which extend three bars 3, 4 and 5 forming the core of the spool. At least one of the end discs 2 is removable from the bars to enable the record band to be looped around one of the bars, e.g. 3. When assembled to the bars, the end disc may be secured thereto in any convenient way, e.g. by a set screw. The end discs are provided with bearing parts 6, at least one of which may have teeth for driving engagement with a stub spindle rotatable in the frame structure 10, in which the spool is adapted to be mounted.

Between adjacent turns of the double wound spiral of the band 15, when wound on the spool 1, is located a band 30 made of paper or other non-magnetic material and constituting an isolating layer between the magnetically coated surfaces of the magnetic band which would otherwise come into contact when the band is wound up on the spool.

Figure 1:
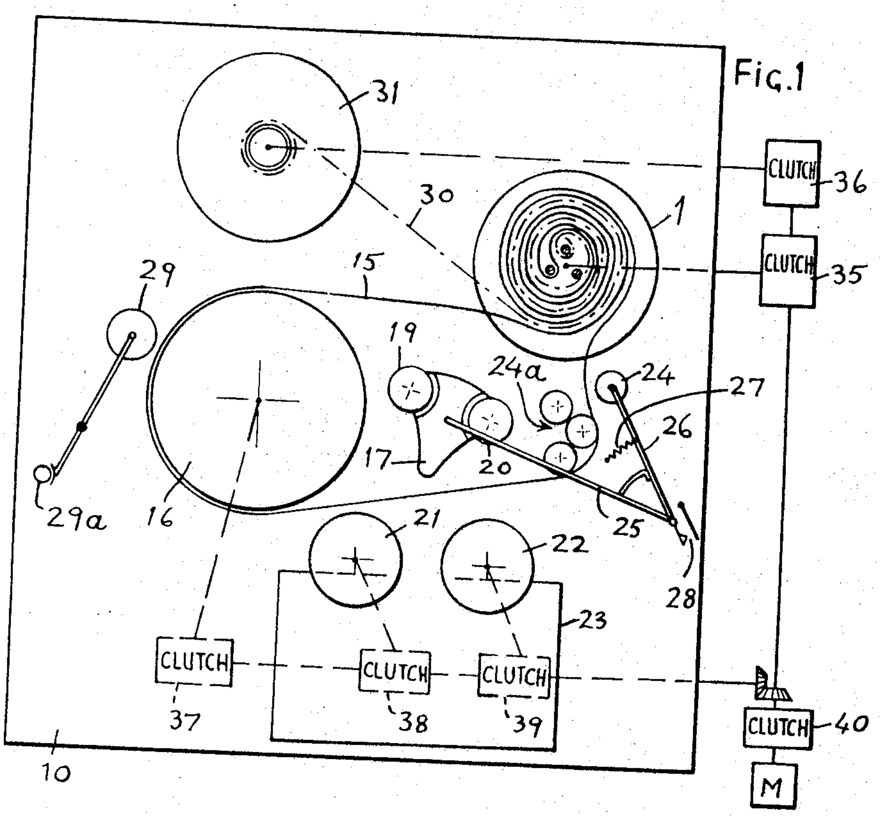
FIGURE 1 is a schematic side view of a machine according to the invention, showing the feeder mechanism in the position for inserting the spool of record band into the machine.

When the spool 1 is inserted into the machine, the free end of the endless band 15 is looped around the capstan 16 and guide rollers **24*a*, and the free end of the isolating band 30 is secured to the roller 31**, all as shown in FIGURE 1.

Figure 2:
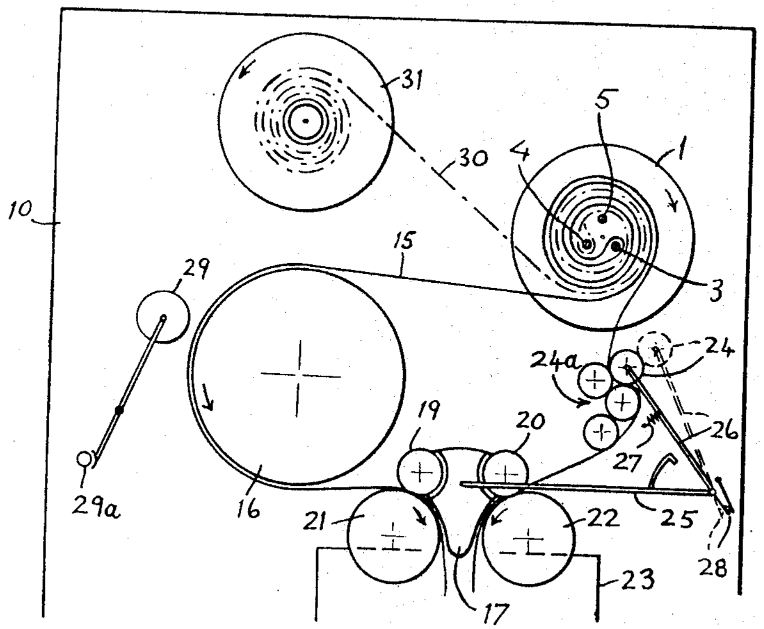
FIGURE 2 is a view similar to FIGURE 1 with the feeder mechanism in the position for feeding the band, the band having been partly unwound from the spool and being feed into the random storage chamber.

The machine also comprises a feeder member 17 which is carried on an arm 25 which can swing about a pivot 18 carried by the frame structure to move the feeder member 17 from its inoperative position shown in FIGURE 1 to its feed position shown in FIGURE 2. The feeder member 17 carries two counter rollers 19 and 20, and when the feeder member 17 is swung to the feed position (FIGURE 2) a part of the band 15 is pressed by the nose of the feed member 17 between the two drive rollers 21, 22, which are located at the opening of a random storage compartment diagrammatically shown at 23 and with parts of the band 15 pressed against the drive rollers 21 and 22 by the counter rollers 19 and 20 respectively.

A control roller 24, adapted to cooperate with the guide rollers **24*a*, is mounted on arm 26 for swinging movement about the pivot 18 and is urged by a spring 27 towards the rollers 24*a*. Movement of arm 26 actuates the contacts of an electric switch 28, the contacts being closed when the control roller 24 is bearing against the rollers 24*a*, and are opened when the roller 24 is moved away from the rollers 24*a*. The arms 25 and 26 interengage so that when the feeder member 17 is in its inoperative position (FIGURE 1) the arm 25 moves the arm 26 against the action of the spring 27 to the open position in which the control roller 24 is spaced from the rollers 24*a* and the contacts 28 are open. However, when the feeder member is moved to its feed position (FIGURE 2) the arm 25 disengages from the arm 26 and the latter is free to move under the action of the spring 27 to deflect the band 15 towards the rollers 24*a* as shown in FIGURE 2. However, when the band 15 becomes tensioned as shown in FIGURE 3, the control roller 24 is displaced and the arm 26 moves to open contacts 28**.

As diagrammatically indicated in FIGURE 1, spool 1, roller 31 and capstan 16 are driven from the motor M through clutches 35, 36, 37 respectively and drive rollers 21, 22 are driven from the motor M through reversing clutches 38, 39. The clutches are conveniently electrically actuated and selectively controlled to drive the various members as hereinafter described.

After the spool has been inserted in the machine and the band 15 looped around the capstan and guide rollers **24*a*, and the isolating band 30 has been attached to the roller 31 as shown in FIGURE 1, the feed member 17 is moved to the position shown in FIGURE 2. The clutches 36, 38 and 39 are to drive the roller 31 in the anticlockwise direction and the drive rollers 21 and 22 in the clockwise and anticlockwise directions respectively (FIGURE 2). The record band 15 is thereby withdrawn from the spool and fed into the random storage compartment and the isolating band 30 is simultaneously wound on the roller 31. When the band 15 is fully withdrawn from the spool, it becomes tensioned between the spool and the guide rollers 24*a* whereby the roller 24 is moved to the position shown in dotted lines in FIGURE 2 to open the contacts 28 which disengages clutch 39 to interrupt the motor drive to the rollers 21, 22 and 31**.

Figure 3:
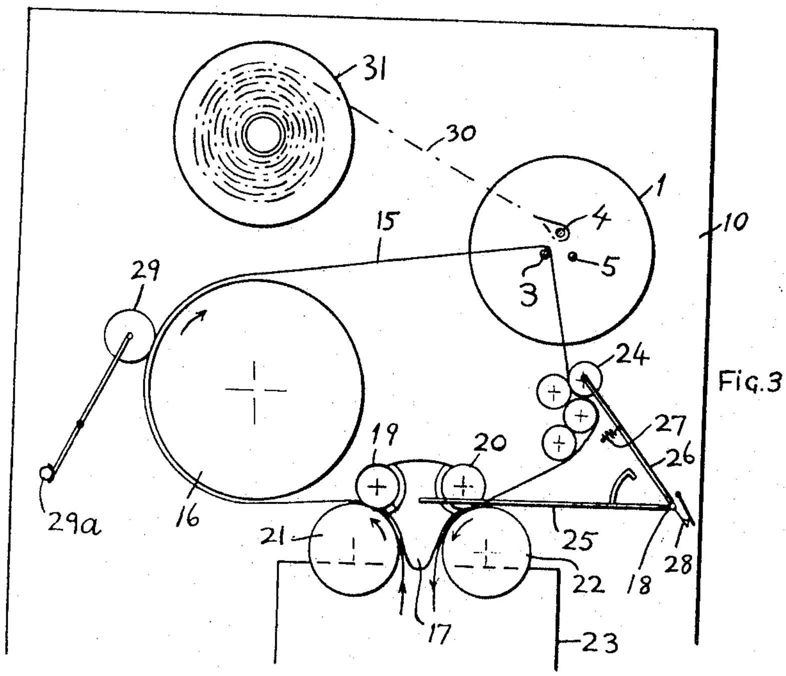
FIGURE 3 is a diagram similar to FIGURE 2, explaining the functioning of the machine for recording or playback.

FIGURE 3 shows the conditions while the endless band is being fed through the machine for recording or playback. The clutches are selectively energised to rotate the drive rollers 21 and 22 in the anticlockwise direction and the capstan 16 in the clockwise direction. The band is thus fed passed the transducer 29 which is only moved into engagement with the band during recording or playback. The transducer may be moved transversely of the band 15 by means of a feed screw **29*a* which is driven in known manner to follow the parallel tracks on the band, whether these form a continuous helical track or are parallel to the edge of the band and track switching occurs at a selected zone of the band. The band moves around the core bar 3 of the spool during operation, and since the tension on the band remains uniform, the roller 24 bears against the rollers 24*a***.

Figure 4:
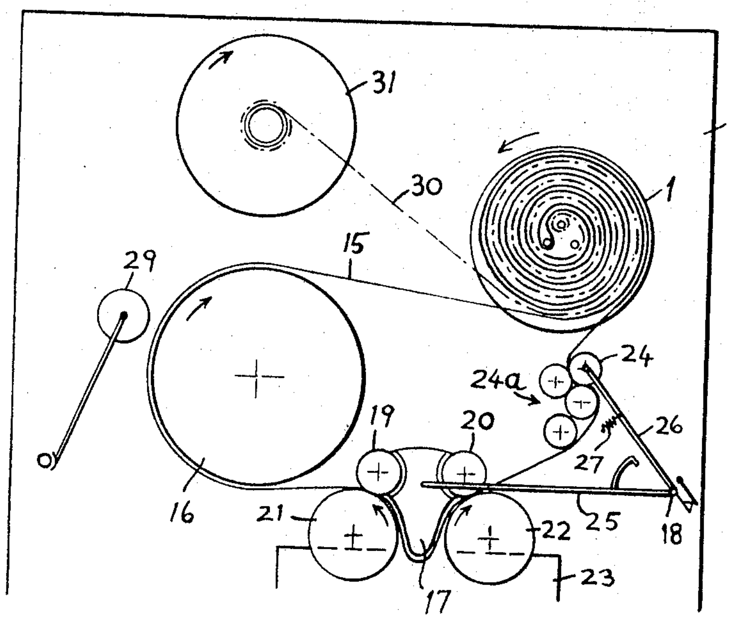
FIGURE 4 is a diagram similar to FIGURE 2, showing the operation of the machine for rewinding the band on the spool.

When the band is to be removed from the machine, the clutches are selectively operated to rotate the drive rollers 21 and 22 in anticlockwise and clockwise directions respectively and the spool 1 anticlockwise, as indicated in FIGURE 4 which shows the position when the endless band 15 and the isolating band 30 are almost completely rewound on the spool 1. When the band is fully withdrawn from the random storage compartment 23, it becomes tensioned and moves the control roller 24 to open the contacts 28 and disconnect clutch 39. The feeder member 17 is then moved to its inoperative position and the spool 1 with the band thereon can be removed.

The band can be stored until again required for use, either on the spool or removed from the spool.

The machine may include gear change means enabling the rollers to be rotated at higher speeds during unwinding and rewinding than during recording or playback, and also at high speed when circulating the band to select a desired section thereof for playback.

I claim:

1. Signal recording and/or playback apparatus comprising a wide band record in the form of an endless loop which is inserted into the apparatus wound-up in double spiral form, a storage compartment which is adapted to store therein, in a random fashion, a major part of the band, said compartment having an opening through which the band can be withdrawn from and fed into the compartment, drive rollers positioned respectively adjacent opposite sides of said opening, a transducer head, a capstan for advancing the band past said transducer head, a movable feeder member comprising counter rollers adapted to co-operate with said drive rollers respectively, the loop of band at the free end of the spirally wound-up band being looped around said capstan and said feeder member, said feeder member being movable from a first position in which said counter rollers are spaced from said drive rollers to a second position in which said counter rollers are urged towards their associated drive rollers respectively with the band gripped therebetween and traversing said opening, and means for selectively driving both said drive rollers in opposite directons towards the opening to feed the band through the opening and into the random storage compartment, and for driving one of said drive rollers towards said opening and at least one of said other drive roller and capstan in the direction to withdraw the band from said compartment and feed it past the transducer.

2. Apparatus as claimed in claim 1, and including means responsive to tension on the band for interrupting the means driving both said drive rollers in opposite directions towards said opening when the spirally wound-up band is fully unwound.

3. Apparatus as claimed in claim 2, and including a spool having at least two spaced core members about one of which the band is looped, and means for selectively driving the spool to wind the band thereon in double spiral form and simultaneously driving both said drive rollers in opposite directions away from said opening to withdraw the band from the random storage compartment as it is being wound-up on the spool.

4. Apparatus as claimed in claim 3, wherein said means responsive to tension on the band also interrupts the means driving both said drive rollers in opposite directions away from said opening when the band, apart from the loop extending around the capstan and feeder member, is rewound on the spool.

5. Apparatus as claimed in claim 4, wherein the spool with the band wound-up thereon is removable from the apparatus.

6. Apparatus as claimed in claim 5, wherein a band of isolating material is interleaved between the double spiral turns of the record band on the spool, the inner end of said isolating band being attached to a spaced core member of said spool other than the core member about which the record band is looped.

7. Apparatus as claimed in claim 6, including a storage roller on which said isolating band is adapted to be wound-up when the record band is unwound from the spool and stored in the random storage compartment, and means for driving said storage roller when both said drive rollers are being driven in opposite directions towards the opening.

8. Apparatus as claimed in claim 4, wherein movement of the feeder mechanism to its said first position actuates said means responsive to tension on the band to interrupt the drive to said drive rollers.

References Cited

UNITED STATES PATENTS

| | | | |
|---|---|---|---|
| 1,238,694 | 8/1917 | Macomber | 242—55.16 |
| 1,308,293 | 7/1919 | Maggard | 242—55.16 X |
| 2,325,400 | 7/1943 | Hoover | 242—67.3 X |

LEONARD D. CHRISTIAN, *Primary Examiner.*

U.S. Cl. X.R.

226—118; 242—67.4